United States Patent
Illenberger et al.

(10) Patent No.: US 11,995,789 B2
(45) Date of Patent: May 28, 2024

(54) SYSTEM AND METHOD OF CREATING, HOSTING, AND ACCESSING VIRTUAL REALITY PROJECTS

(71) Applicant: VRdirect GmbH, Munich (DE)

(72) Inventors: Rolf Illenberger, Baldham (DE); Theo Makola, Mannheim (DE)

(73) Assignee: VRDIRECT GMBH, Munich (DE)

( * ) Notice: Subject to any disclaimer, the term of this patent is extended or adjusted under 35 U.S.C. 154(b) by 0 days.

(21) Appl. No.: 18/210,239

(22) Filed: Jun. 15, 2023

(65) Prior Publication Data

US 2023/0410448 A1  Dec. 21, 2023

Related U.S. Application Data

(60) Provisional application No. 63/352,396, filed on Jun. 15, 2022.

(51) Int. Cl.
*G06T 19/20* (2011.01)
*G06Q 10/10* (2023.01)

(52) U.S. Cl.
CPC ........... *G06T 19/20* (2013.01); *G06Q 10/103* (2013.01); *G06T 2219/024* (2013.01); *G06T 2219/2004* (2013.01)

(58) Field of Classification Search
CPC .............. G06T 19/20; G06T 2219/024; G06T 2219/2004; G06Q 10/103
See application file for complete search history.

(56) References Cited

U.S. PATENT DOCUMENTS

| | | | | |
|---|---|---|---|---|
| 5,689,669 A | * | 11/1997 | Lynch | G06F 3/0481 715/848 |
| 6,002,853 A | * | 12/1999 | de Hond | G06F 16/954 709/219 |
| 6,079,982 A | * | 6/2000 | Meader | A63F 13/54 434/30 |
| 6,119,147 A | * | 9/2000 | Toomey | H04L 12/1831 719/329 |
| 6,179,619 B1 | * | 1/2001 | Tanaka | A63G 7/00 472/60 |

(Continued)

FOREIGN PATENT DOCUMENTS

WO  2019060985 A1  4/2019

*Primary Examiner* — Nicholas Augustine
(74) *Attorney, Agent, or Firm* — Shumaker, Loop & Kendrick, LLP

(57) ABSTRACT

A system and a method of creating, hosting, and accessing a VR project is described. Media files are imported into a software application running on a system and details of interaction between the media files are provided. The media files are processed based on the details of interaction for creation of the VR project. The VR project may include multiple versions of media files prepared based on configurations of user devices requiring access to the VR project. A user device may place a request to a server hosting the VR project. The server may identify an optimal version of media files for the user device, based on configurations of the user device. The optimal version of the media files along with a corresponding VRXF file including details of interactions between the media files is transmitted to the user device, for delivering a best VR experience of the VR project.

20 Claims, 7 Drawing Sheets

(56) References Cited

U.S. PATENT DOCUMENTS

| | | | |
|---|---|---|---|
| 6,219,045 B1* | 4/2001 | Leahy | H04L 67/10 709/204 |
| 6,243,091 B1* | 6/2001 | Berstis | G06F 3/04815 715/205 |
| 6,271,843 B1* | 8/2001 | Lection | G06T 15/00 715/848 |
| 6,362,817 B1* | 3/2002 | Powers | G06T 17/00 345/428 |
| 6,396,522 B1* | 5/2002 | Vu | G06F 3/04845 715/848 |
| 6,414,679 B1* | 7/2002 | Miodonski | G06T 13/00 707/999.005 |
| 6,570,563 B1* | 5/2003 | Honda | A63F 13/352 345/473 |
| 6,573,903 B2* | 6/2003 | Gantt | G06F 30/00 345/619 |
| 6,590,593 B1* | 7/2003 | Robertson | G06F 3/04815 715/848 |
| 6,621,508 B1* | 9/2003 | Shiraishi | G06F 3/0481 715/764 |
| 6,690,393 B2* | 2/2004 | Heron | G06T 19/00 715/848 |
| 6,784,901 B1* | 8/2004 | Harvey | H04L 67/02 715/848 |
| 6,961,055 B2* | 11/2005 | Doak | A63F 13/63 345/677 |
| 7,119,819 B1* | 10/2006 | Robertson | G06F 3/04815 715/848 |
| 7,382,288 B1* | 6/2008 | Wilson | G08G 5/0021 340/972 |
| 7,414,629 B2* | 8/2008 | Santodomingo | G06T 17/05 345/582 |
| 7,467,356 B2* | 12/2008 | Gettman | G06Q 30/02 715/850 |
| 7,542,040 B2* | 6/2009 | Templeman | G06T 13/40 345/474 |
| 7,653,877 B2* | 1/2010 | Matsuda | G06F 16/957 463/32 |
| 7,663,625 B2* | 2/2010 | Chartier | G06T 19/20 700/182 |
| 7,746,343 B1* | 6/2010 | Charaniya | G06N 7/01 345/428 |
| 7,788,323 B2* | 8/2010 | Greenstein | G06Q 10/10 715/744 |
| 7,804,507 B2* | 9/2010 | Yang | H04N 13/344 345/633 |
| 7,814,429 B2* | 10/2010 | Buffet | G06F 30/00 715/763 |
| 7,817,150 B2* | 10/2010 | Reichard | G06T 15/20 715/705 |
| 7,844,724 B2* | 11/2010 | Van Wie | H04L 67/131 709/227 |
| 9,696,795 B2* | 7/2017 | Marcolina | G06T 17/10 |
| 9,749,367 B1* | 8/2017 | Kirby | G06Q 10/101 |
| 9,996,797 B1* | 6/2018 | Holz | G06F 3/04842 |
| 11,592,896 B2 | 2/2023 | Paez et al. | |
| 2001/0018667 A1* | 8/2001 | Kim | G06Q 30/0277 705/14.73 |
| 2002/0095463 A1* | 7/2002 | Matsuda | G06F 16/957 709/204 |
| 2002/0113820 A1* | 8/2002 | Robinson | G06F 16/954 715/764 |
| 2004/0113887 A1* | 6/2004 | Pair | G09B 25/08 345/156 |
| 2004/0193441 A1* | 9/2004 | Altieri | A63F 13/216 709/203 |
| 2005/0093719 A1* | 5/2005 | Okamoto | G01C 21/3697 705/14.62 |
| 2005/0128212 A1* | 6/2005 | Edecker | G06T 17/05 345/581 |
| 2008/0030429 A1* | 2/2008 | Hailpern | G06T 7/73 345/8 |
| 2008/0125218 A1* | 5/2008 | Collins | G06Q 90/00 463/31 |
| 2008/0235570 A1* | 9/2008 | Sawada | G06Q 10/10 356/3 |
| 2008/0246693 A1* | 10/2008 | Hailpern | G06T 7/246 345/8 |
| 2009/0076791 A1* | 3/2009 | Rhoades | A63F 13/53 703/21 |
| 2009/0091583 A1* | 4/2009 | McCoy | G06T 19/006 345/419 |
| 2009/0287728 A1* | 11/2009 | Martine | G06Q 30/02 715/810 |
| 2009/0300528 A1* | 12/2009 | Stambaugh | G06F 3/04817 715/764 |
| 2010/0070378 A1* | 3/2010 | Trotman | G06Q 30/02 705/26.1 |
| 2010/0115428 A1* | 5/2010 | Shuping | G06F 3/0481 715/277 |
| 2010/0205541 A1* | 8/2010 | Rapaport | G06Q 10/10 715/753 |
| 2010/0214284 A1* | 8/2010 | Rieffel | G06T 17/00 382/154 |
| 2010/0274567 A1* | 10/2010 | Carlson | G06Q 40/02 235/487 |
| 2010/0274627 A1* | 10/2010 | Carlson | G06Q 20/20 705/16 |
| 2011/0010636 A1* | 1/2011 | Hamilton, II | G06Q 30/0631 705/26.7 |
| 2011/0041083 A1* | 2/2011 | Gabai | G06Q 10/00 715/753 |
| 2016/0292925 A1* | 10/2016 | Montgomerie | H04L 65/75 |
| 2017/0185261 A1* | 6/2017 | Perez | G06F 3/04845 |
| 2020/0193163 A1* | 6/2020 | Chang | H04N 21/4662 |

* cited by examiner

SYSTEM AND METHOD OF CREATING, HOSTING, AND ACCESSING VIRTUAL REALITY PROJECTS

PRIORITY INFORMATION

This application claims the benefit under 35 U.S.C. § 119(e) of U.S. Provisional Patent Application Ser. No. 63/352,396, filed Jun. 15, 2022, entitled "SYSTEM AND METHOD OF CREATING, HOSTING, AND ACCESSING VIRTUAL REALITY PROJECTS," the entire contents of which is incorporated by reference herein.

FIELD OF INVENTION

The present invention is directed to Virtual Reality (VR), and more particularly to the distributed management of VR projects.

BACKGROUND OF INVENTION

Technology has advanced to a level where different techniques, platforms, and high end graphic processing devices are available for processing information, specifically media files, for generation of Virtual Reality (VR) data.

Typically, very high quality 360-degree media files are processed for development of VR data. The VR data is generally developed for being played on supporting VR devices, i.e., VR devices including specifications that are compatible with and sufficient to process the VR data. Sometimes, the VR data is made available in different formats/versions compatible with different VR devices. In such cases, the VR devices do not possess the capability to identify the optimal VR data from several formats/versions of the VR data.

Further, programmers are required to write massive program codes defining the instructions for the processing of media files. Based on these instructions, the media files are processed to generate VR data. Development of these program codes requires a vast knowledge of 3D programming and processing of media files.

Therefore, there exists a need for a simple and convenient manner of generation of VR projects without requiring knowledge of programming and 3D processing of media files, and identification of different VR projects optimal for being played on any VR device.

SUMMARY

It is one of the objectives of the present disclosure to provide a method of identifying and executing an optimal version of media files of a Virtual Reality (VR) project, and that avoids the drawbacks of the prior art.

In order to achieve the objectives, the present disclosure provides a technical feature in which a system and a method of creating, hosting, and accessing a VR project is described. Media files may be imported into a software application running on a user device, by a VR project creator. The VR project creator may also provide creative inputs such as interaction between the media files. Details of interaction between the media files may be provided to the software application. The software application may process the media files based on the details of the interaction, for creation of a VR project. A user device may place a request to a server hosting multiple versions of media files related to the VR project, for accessing the VR project. The server may identify an optimal version of media files of the corresponding VR project from the multiple versions of media files, based on the user device's configuration, such as its hardware capabilities (processing, display, storage, and communication capability) and firmware type and version. The user device may play the optimal version of the media files of the VR project.

In one implementation, a system for creation and management of VR projects may comprise a memory and a processor operatively coupled to the memory. The memory may be configured to store programmed instructions. The processor may be configured to execute the programmed instructions to allow a VR project creator to select a plurality of media files and define interactions between the plurality of media files. The processor may be further configured to create a VR project including a text file and the plurality of media files. The text file includes references to storage locations of the plurality of media files and details of the interactions between the plurality of media files. The processor may be further configured to manage storage of the text file and provide access of the text file to a user device in response to a user request.

In one aspect, the text file is a VRXF file.

In one aspect, the plurality of media files is stored in the memory or is available over Internet.

In one aspect, the processor executes one or more applications for editing the plurality of media files.

In one aspect, the processor executes generative data models for generating a VRXF file and one or more media files to be used for creating the VR project.

In one aspect, the text file is executed by a VR playing component running on the user device.

In one aspect, the storage of the text file is performed, or the access of the text file is provided based on rules set by a third party.

In one aspect, the processor processes the plurality of media files to generate multiple versions of the plurality of media files suitable for different configurations of different user devices, wherein the processing includes modifying resolution, modifying orientation, and compression of the plurality of media files.

In one aspect, the processor provides access of an optimal version of the plurality of media files to the user device, and wherein the processor determines the optimal version of the plurality of media files based on configuration details of the user device, received through the user request.

In one aspect, the configuration details include software type and version, hardware capability, and Degrees of Freedom (DoF) available for interaction.

In one aspect, the creation of the VR project is performed by a first processing device and the storage and access of the text file is managed by a second processing device.

In one implementation, a method of creation and management of VR projects is described. The method comprises allowing a VR project creator to select a plurality of media files and define interactions between the plurality of media files. The method further comprises creating a VR project including a text file and the plurality of media files. The text file includes references to storage locations of the plurality of media files and details of the interactions between the plurality of media files. The method further comprises managing storage of the text file and providing access of the text file to a user device in response to a user request.

Features and advantages of the subject matter hereof will become more apparent in light of the following detailed description of selected embodiments, as illustrated in the accompanying FIGS. As will be realized, the subject matter disclosed is capable of modifications in various respects, all without departing from the scope of the subject matter. Accordingly, the drawings and the description are to be regarded as illustrative in nature.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION OF THE EMBODIMENTS

The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items.

Figure 1:
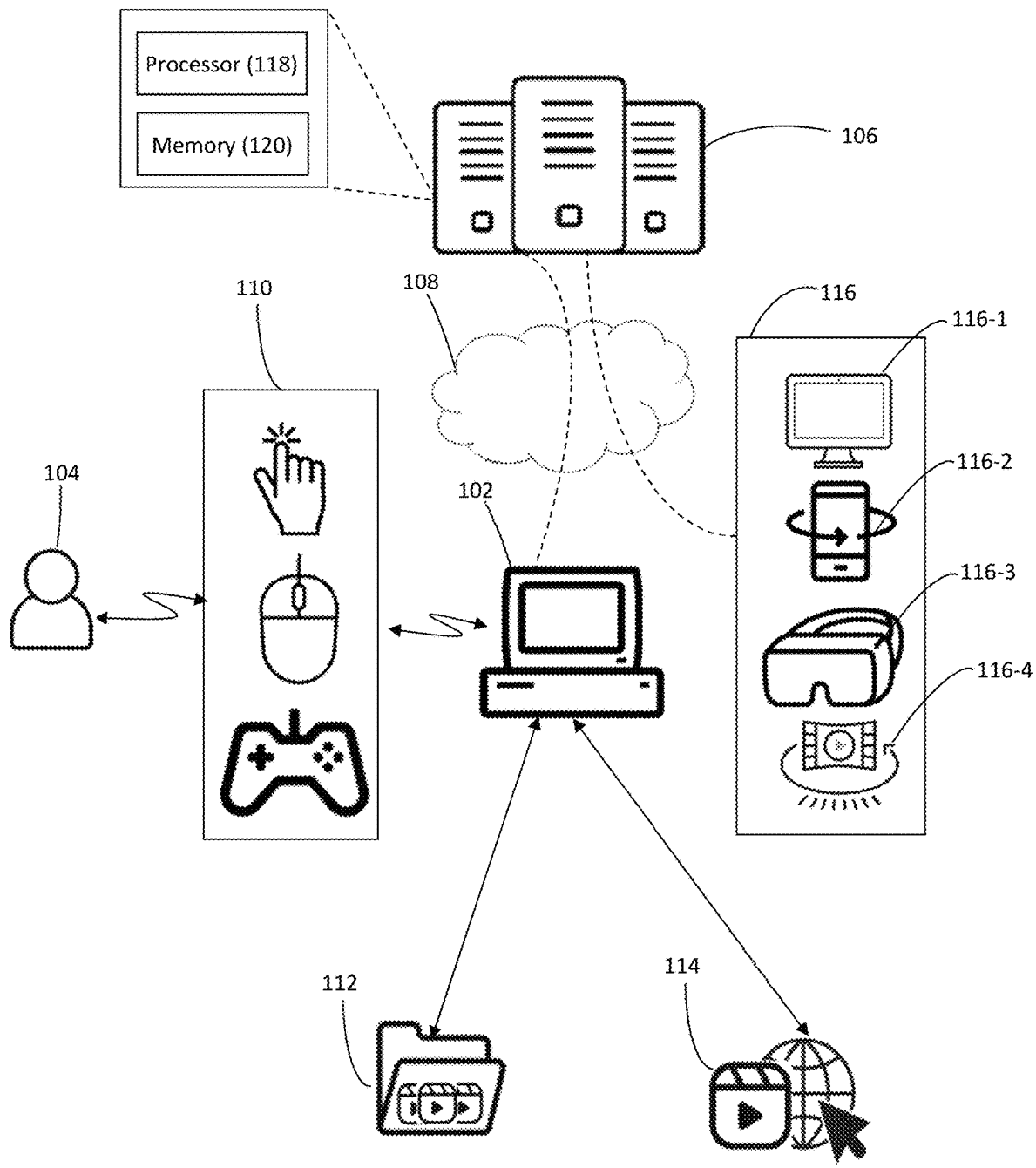
FIG. 1 illustrates an example illustration of an environment for distributed management of Virtual Reality (VR) projects, in accordance with one embodiment of present disclosure.

In one working embodiment of the present disclosure, referring to FIG. 1, distributed management of Virtual Reality (VR) projects is explained. FIG. 1 illustrates an example illustration of an environment for distributed management of VR projects. A system 102 operable by a VR project creator 104 may be connected with a server 106. The system 102 may be connected with the server 106 through a communication network 108. To create a VR project, the VR project creator 104 may access a software application running on the system 102 or the server 106. The VR project creator 104 may access the software application by operating one of several input means 110 including a touch-controlled device, a mouse, or a handheld controller.

The software application may receive one or more media files or one or more media assets from the VR project creator 104. The one or more media files may be present in a local storage 112 or a remote storage 114. The local storage 112 may be a memory of the system 102 or a memory of data storage/processing device connected with the system 102 through a wired or wireless connection. The remote storage 114 may correspond to a web location present over Internet or over a private network or a memory 120 of the server 106.

Although in preferred implementations, the one or more media files may include 3600 and 2D image files, it may be possible to utilize other forms of media files such as 360° and 2D video files, audio files, 3D model files, 2D images, 2D videos, and livestream media files in different implementations.

After providing the one or more media files, the VR project creator 104 may define interaction between the one or more media files, for example sequence, position, orientation, distance, and behavior of the one or more media files. The VR project creator 104 may define the interactions between the one or more media files by operating one of the several input means 110. The VR project creator 104 may define the interactions by performing simple actions, such as dragging and dropping the one or more media files, and zooming in and out of a scene of a media file through pinching action.

In an example and not by way of any limitation, the VR project creator 104 may establish a connection between one or more scenes. Further, the VR project creator 104 may add an image or an audio file to the scene. The VR project creator 104 may add actions such as show or hide objects, activate or deactivate objects, start, pause or stop animation, loop or unloop video sound, start or pause video sound, open Uniform Resource Locator (URL), and send webhook.

The server 106 may include a processor 118 and the memory 120. The memory 120 may be configured to store programmed instructions. The processor 118 may be configured to execute the programmed instructions to implement different functions described henceforth with reference to FIG. 3 through FIG. 5.

Figure 2:
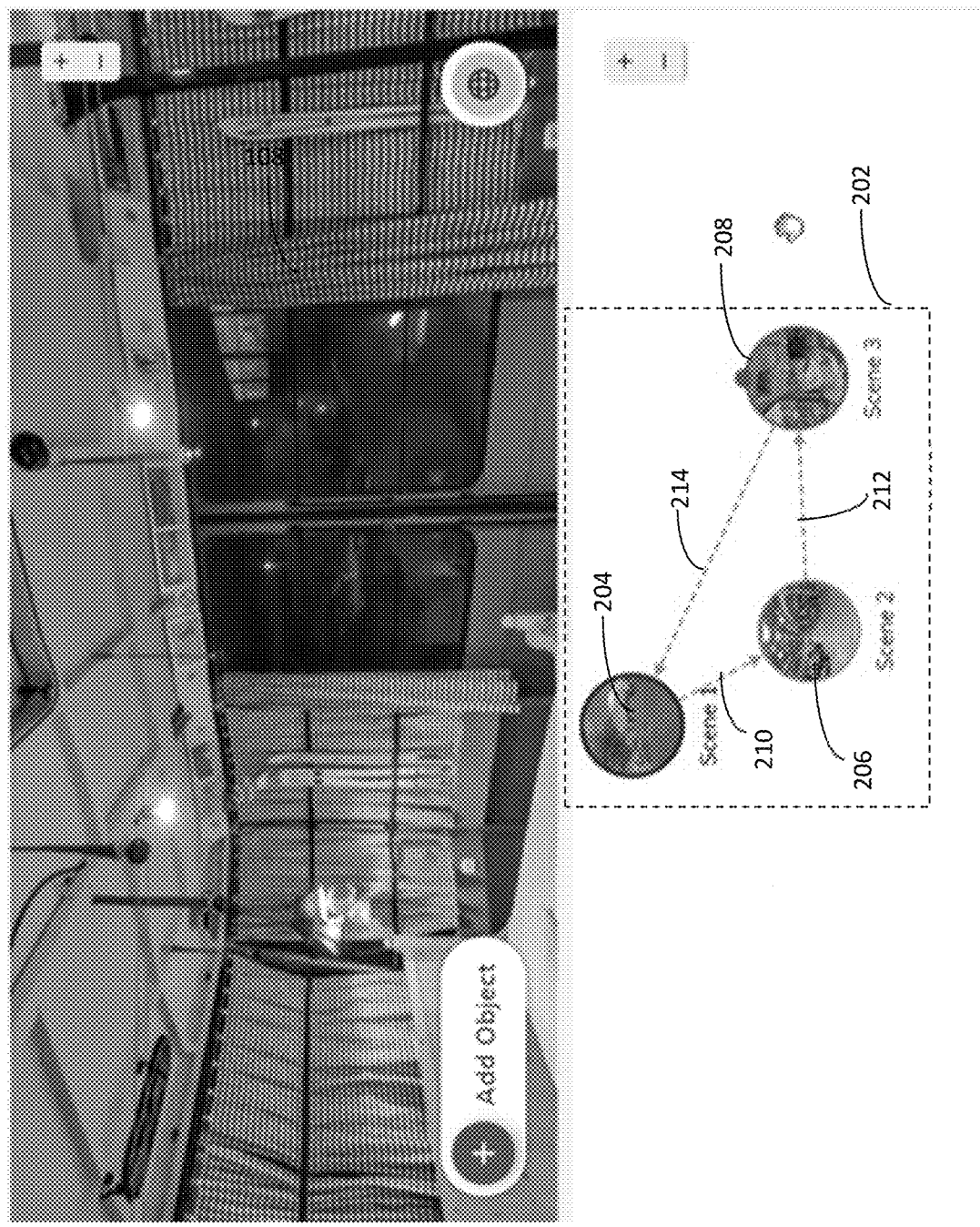
FIG. 2 illustrates an example User Interface of a software application used for generation of a VR project, in accordance with one embodiment of present disclosure.

Referring now to FIG. 2 illustrating an example User Interface (UI) of the software application used for generation of a VR project, the interaction between the one or more media files is explained. In window 202, nodes 204, 206, and 208 indicate three media files, for example 360° images. Further, connecting lines 210, 212, and 214 joining the three media files indicate the relation between the three media files. As mentioned earlier, media files could be added/deleted and the relations between the media files could be defined and changed by simple user actions, including drag and drop operations. It must be understood that three media files and linear relations between them have been illustrated and explained for the ease of illustration and explanation, and the desired number of media files could be added, and any form of relation could be defined between them, as per the requirement.

The software application running on the system 102 may generate a VR project. The VR project may include the one or more media files and a VRXF file including details of the interactions between the one or more media files. The VRXF file may be a text file and may be hosted over the server 106.

The VRXF file may be hosted over the server 106. The VRXF file may be accessed by programmers using processing devices, such as desktops, laptops, and tablets. The VRXF file may be inspected in detail to make any changes by accessing a Command User Interface (CUI).

A snippet of the VRXF file defining the position, rotation, and scale of a scene of a media file is provided below.

```
"transform": {
  "isHidden": false,
  "position": {
    "type": "cartesian",
    "x": −0.572,
    "y": 0.012,
```

-continued

```
    "z": -11.986
},
"rotation": {
    "type": "look-at-position",
    "xCartesianPosition": 0,
    "yCartesianPosition": 0,
    "zCartesianPosition": 0
},
"scale": {
    "x": 4.81,
    "y": 4.81,
    "z": 0.06
```

In the above-described format, the VRXF file may include all details of a VR project.

A group of user devices 116 may connect to the server 106, through the communication network 108, for accessing an optimal version of media files of the VR project. The group of user devices 116 may include applications and devices capable of playing VR projects, such as, desktops 116-1, smartphones or tablets 116-2, VR headsets 116-3, and browsers 116-4. The VR project may be optimal for some user devices but not all because user devices manufactured by same or different vendors may have different configurations. Configuration of each user device of the group of user devices 116 may include hardware capabilities, firmware/software type and version, and Degrees of Freedom (DoF) available for interaction. The hardware capabilities may correspond to one or more of processing power, display type and resolution, data compression-decompression capability, storage volume, and communication capability. An increase in DoF available for interaction increases quality of immersive experience obtained by a user. For example, a user device supporting 6-DoF would provide a better VR experience than a user device supporting 3-DoF.

The configurations may need to be considered for the generation of different versions of media files of the VR project, optimal for each user device. The configurations of the group of user devices 116 may be available with the server 106. The server 106 may create several versions of media files of the VR project by processing the media files based on the different configurations/specifications of the group of user devices 116. Processing of the media files based on the configuration of each user device may include modifying resolutions of the media files, modifying orientations of the media files, and compression of the media files.

Different versions of media files of the VR project described to be generated above may be stored alongside a VRXF file in a VR project package. The VRXF file may be a text file including details of the interaction/relation between the media files. The VR project package may be hosted over the server 106.

The package of a VR project may be accessed using the group of user devices 116. When a user device connects with the server 106 to access an optimal version of the media file of the VR project, the server 106 may determine if an access request of the user device fulfills the privacy requirements of a publisher of the VR project package. When a link to a VR project is accessed, the server 106 checks privacy settings associated with the VR project. If the VR project should no longer be accessible, the server 106 prevents its display. This ensures that a publisher of the VR project maintains control over accessibility of his project and manage privacy requirements effectively.

After it is determined that the user device fulfills the privacy requirements, the server 106 may identify the optimal version of media file of the VR project for the user device. Post identification, the server 106 may transmit the optimal version of the media files of the VR project to the user device, through the communication network 108.

In one implementation, the VR project package may include a media files version 1 having a 720p (HD) resolution, a media files version 2 having a Full HD (1080p) resolution, a media files version 3 having a 4K (Ultra HD) resolution, and a media files version 4 having an 8K (Full Ultra HD) resolution. Further, a user device 116-1 may be compatible to play a 720p media files, a user device 116-2 may be compatible to play a Full HD media file, a user device 116-3 may be compatible to play a 4K media file, and a user device 116-4 may be compatible to play an 8K media file. In such case, when the user device 116-2 tries to access an optimal version of the media file of the VR project, the user device 116-2 may be provided an access to the media files version 2 having the Full HID (1080p) resolution. Similarly, when the user device 116-4 tries to access an optimal media file, the user device 116-4 may be provided an access to the media files version 4 having the 8K resolution.

Figure 3:
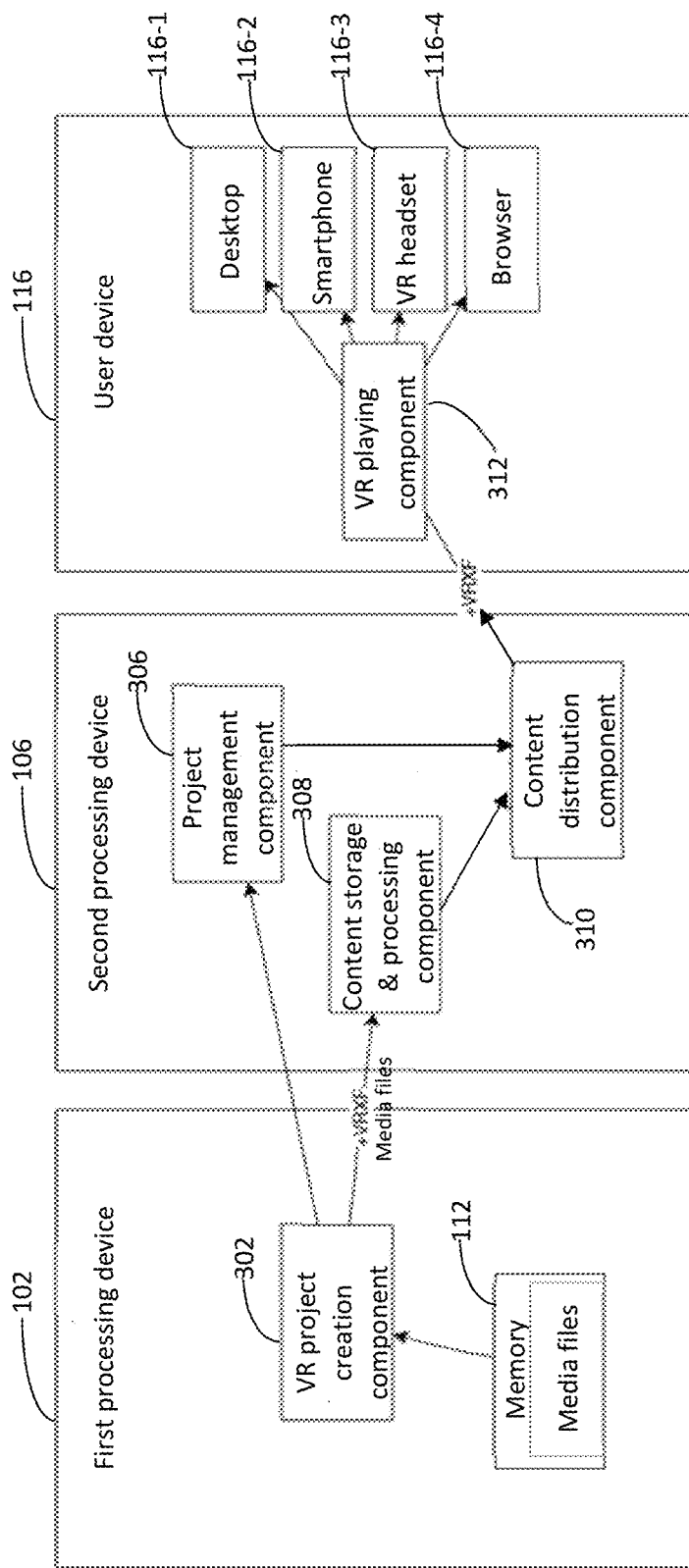
FIG. 3 illustrates a first network implementation for creation and management of VR projects, in accordance with an embodiment of present invention.

FIG. 3 illustrates a first network implementation for creation and management of VR projects, in accordance with an embodiment of present invention. The first network implementation includes a first processing device 102, a second processing device 106, and a user device 116. In present network implementation and other network implementations described henceforth, the first processing device 102 refers to a device accessed by a VR project creator, the second processing device 106 refers to a cloud based data processing device such as the server 106, and the user device 116 refers to a device using which a user i.e. a viewer gains a VR experience. The first processing device 102 may execute a VR project creation component 302. The VR project creation component 302 may be a software application installed on the first processing device 102 for creation of VR projects. In an alternate implementation, the VR project creation component 302 may be a software application hosted over a network cloud, such as the second processing device 106. The VR project creator may access the VR project creation component 302 to select media files stored in the memory 112 of the first processing device 102. The VR project creator may further define interactions between the media files for generation of a VR project. By processing the media files based on the interactions defined between them, the first processing device 102 may create the VR project. The VR project denotes the media files and a VRXF file including references i.e. network locations of the media files along with the interactions specified between the media files. By including the references of the media files instead of the content of the media files, size of the VRXF file would reduce significantly and its transmission would occur quickly.

The VRXF file may be transferred to the second processing device 106. The second processing device 106 may include a project management component 306, a content storage and processing component 308, and a content distribution component 310. In some implementations, the media files may be shared along with the VRXF file to the content storage and processing component 308. The project management component 306 may manage receipt of the VRXF file by the content storage and processing component 308 and distribution of the VRXF file by the content distribution component 310. The content storage and processing component 308 may process the VRXF file or the media file associated with the VRXF file to perform one or more operations, such as upscaling or downscaling of the media files. The content storage and processing component 308 may process the media files to generate multiple versions of the media files which may be suitable for different configurations of different user devices. For example, the content storage and processing component 308 may produce different versions of the media files having different resolutions. The different versions of the media files may be generated before or after a user request to access the VRXF file is received by the second processing device 106.

When the user request to access the VRXF file is received from the user device 116, the content distribution component 310 may provide the VRXF file to a VR playing component 312 of the user device 116. The VR playing component 312 may be a software package having configuration information required to understand and execute the VRXF file. Such configuration information may be similar to the configuration information of the VR project creation component used for creation of the VRXF file. The VR playing component 312 may be developed for use by all types of the user device 116 or may be developed specifically for use on a particular type or brand of the user device 116, such as VR headset developed by HTC®. The VR playing component 312 may also be configured to collect analytical playback data related to the VR projects for gaining access and playback information, to further improve creation and distribution of the VR projects. Further, security policies adhering to corporate, institutional, and/or government agencies could also be predefined within the VR playing component 312. The VR player component 312 may encrypt media files downloaded on the user device 116 to ensure that the media files are not plagiarized. Further, the VR player component 312 may remotely remove unpublished VR projects from all user devices.

In preferred implementations, the content distribution component 310 may provide access of an optimal version of media files to the user device 116. The optimal version of media files may be determined based on the configuration details of the user device 116. For example, when the second processing device 106 determines that the user device 116 is a VR headset 116-3 capable of displaying 4K VR content, 4K media files may be provided to the VR headset 116-3 along with the VRXF file. The VR playing component 312 may execute the VRXF file to provide a VR experience to the user. In different implementations, the configuration information required to understand and execute the VRXF file may be provided within a firmware for example, as a part of an Operating System (OS) or the browser 116-4. In such implementations, the user device 116 running such OS and/or the browser 116-4, such as the desktop 116-1 may be able to execute the VRXF file without requiring to separately download and install the VR playing component 312.

The above described first network implementation allows usage of media files stored locally i.e. within the first processing device 102 itself which is used for creation of VR projects. In this manner, more control is available over the media files used in the VR projects. Further, the first network implementation provides turnkey solutions i.e. VR project creation facility can be easily integrated with existing system(s) of an organization.

Figure 4:
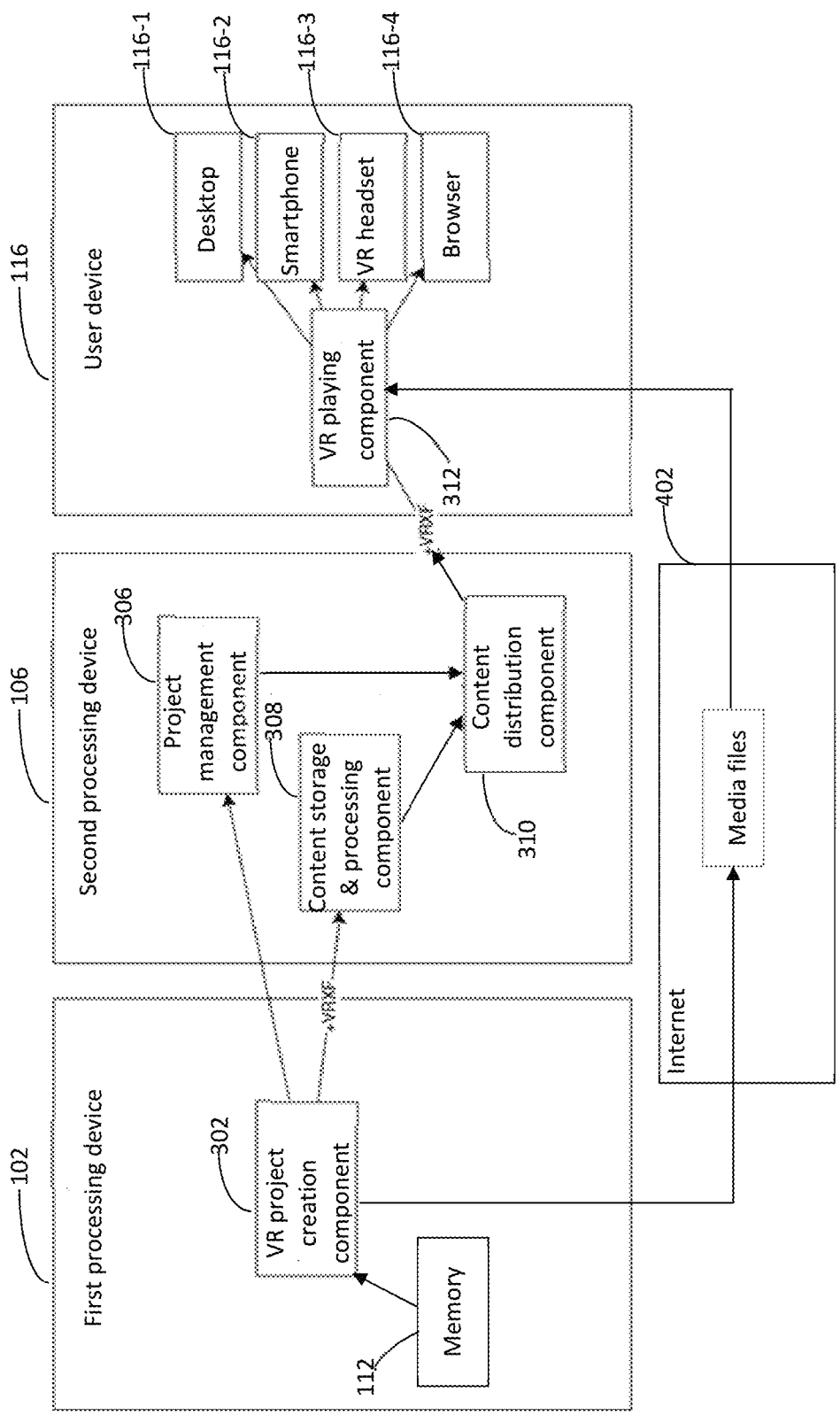
FIG. 4 illustrates a second network implementation for creation and management of VR projects, in accordance with an embodiment of present invention.

FIG. 4 illustrates a second network implementation for creation and management of VR projects, in accordance with an embodiment of present invention. Within the second network implementation, the media files used for creation of the VRXF file are present over internet 402, instead of the memory 112 of the first processing device 102. References such as URLs of the media files may be used by the VR project creation component 302 for creation of the VRXF file. In this manner, any content publicly available over the internet 402 could be referenced for creation of the VRXF file.

Successively, the VRXF file may be transferred to the user device 116 through the second processing device 106. The VR playing component 312 running on the user device 116 may execute the VRXF file to provide the VR experience to the user.

By utilizing the second network implementation, consumption of the memory 112 is reduced as the media files present over the internet 402 are used. Further, an author of the media files manages access of content through enforcement of desired security policies. The author corresponds to a person owning the media files, for example a copyright holder of the media files. The media files can be distributed on a network satisfying requirements of the author e.g. a networked node nearest to intended users/target consumers. Also, access or restriction to access of content based on geolocation and security and/or government policies can be implemented.

Figure 5:
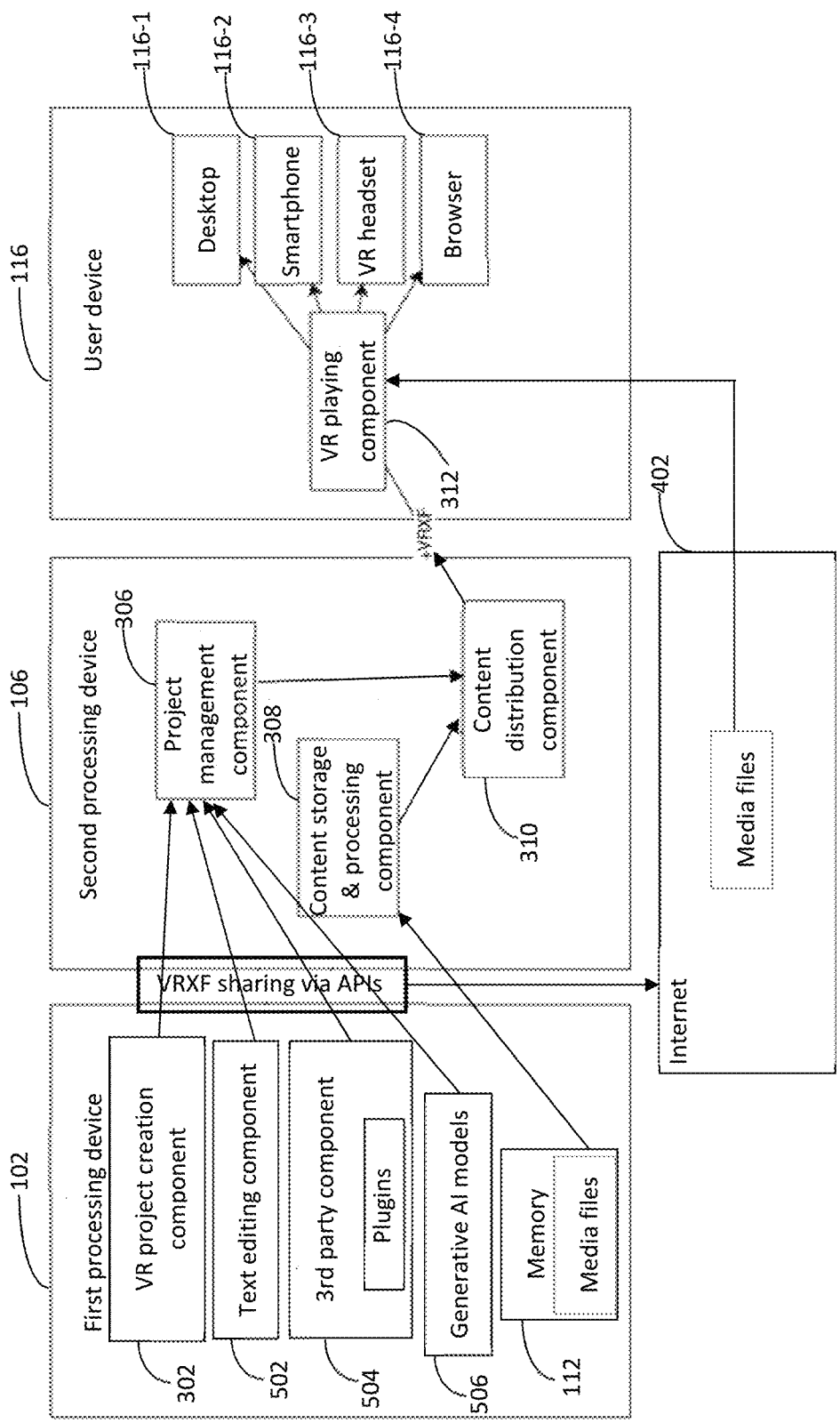
FIG. 5 illustrates a third network implementation for creation and management of VR projects, in accordance with an embodiment of present invention.

FIG. 5 illustrates a third network implementation for creation and management of VR projects, in accordance with an embodiment of present invention. Some of the media files used for creation of the VRXF file may be present over the internet 402 and some of the media files may be stored in the memory 112 of the first processing device 102. The VR project creation component 302 may utilize references of the media files required for generation of the VR project. The first processing device 102 may also include a text editing component 502. The text editing component 502 may allow for manual creation or editing of a VRXF file according to the VRXF specification and reference the associated media files. The first processing device 102 may also include a third party component 504 having plugins for receiving VR projects created on other processing devices/systems and/or itself creating VR projects. The first processing device 102 may also include generative AI models 506 trained to produce a VRXF file and media files or any other content required for generation of the VR projects. VRXF file generated or edited using the VR project creation component 302, the text editing component 502, the third party component 504, and the generative AI models 506 may be transferred to the project management component 306 through Application Programming Interfaces (APIs).

By utilizing the third network implementation, the author of the media files may be able to manage access of content through enforcement of desired security policies. The media files can be distributed on a network satisfying requirements of the author e.g. a networked node nearest to intended users/target consumers. Access or restriction to access of content based on geolocation and security and/or government policies can be implemented. The VR projects could be created by any person on his system and shared with the third party component 504. Further, data available for creation of the VR projects does not remain limited to the media files, instead, required media files could be created using the generative AI models.

In above described network implementations, the first processing device 102 and the second processing device 106 have been shown separately and their functionalities have been described separately to clearly explain, in a sequential manner, different steps that occur from creation of VR projects till distribution of VR projects. However, it must be understood that the functionalities of the first processing device 102 and the second processing device 106 could be configured on a single processing device, such as the second processing device 106 itself. Further, the project management component 306, the content storage and processing component 308, and the content distribution component 310 have been shown to be configured within a single processing device i.e. the second processing device 106. In different implementations, such components may be configured on different systems and may be managed by a single party or different parties. In such implementations, storage, management, and distribution of VR projects could be decentralized and suited as per requirements of an author of the media files, creator of the VR projects, and the user of the VR projects. Further, a Data Rights Management (DRM) service could be integrated within any of the project management component 306, the content storage and processing component 308, or the content distribution component 310. Integration of the DRM service would allow an author to control access of the media files and a creator to control access the VR projects.

In some network implementations, the first processing device 102 may allow optimization of the media files, modification of hue/saturation of the media files, scaling of image content and quality, application of filters, greenscreen keying for creation of VR projects. Further, the first processing device 102 may offer Artificial Intelligence (AI) assisted optimization of complex source 3D models to be consumable in an immersive environment. For example, complex Computer Aided Design (CAD) models include several data points which are not relevant for immersive viewing and appropriate for fast data transfer across networked devices. Such CAD models could be optimized for creation of VR projects. The first processing device 102 may also allow trimming and audio level mixing of audio and video content to only include parts needed for the VR projects. Such processing of the audio and video content would reduce data requirements of the VR projects and eliminate the need learn or use complex video and audio editing software applications. The first processing device 102 may further allow patching of 360° image and video content to extract the required visual parts. Such processing allows better layering of content in complex 360° environments and reduces the overall size of the 360° image and video content for transfer and playback of 360° content. The first processing device 102 may offer audio-assisted authoring for execution of actions based on audio commands. Audio-assisted authoring can be very quick compared to usage of the input means 110. Audio-assisted authoring makes discovery of authoring features more natural to inquisitive nature of humans.

The generative AI models 506 may be used for generation of project templates with provided prompts and media files. AI may also be used for generation of navigation prompts throughout a VR project based on content of 360° video or 360° image. For example, a door detected in one image may lead to another 360° image having a similar door, but from other side. AI would generate an interaction between the 2 data points i.e. the doors to allow a user to navigate between them.

Post creation of a VR project, the VR project creator 104 may allow preview of a VR project, based on configurations of the group of user devices 116. In this manner, the VR project creator 104 may be able to view how someone using a specific user device may experience the VR project.

Figure 6:
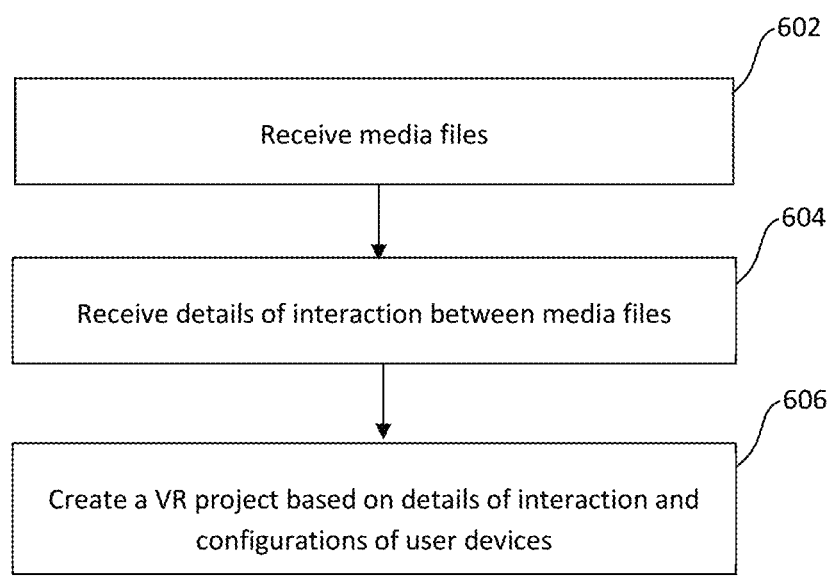
FIG. 6 illustrates a flow chart of a method for generating a VR project, in accordance with one embodiment of present disclosure.

Referring to FIG. 6, a flow chart of a method of creating a VR project is explained, in accordance with one exemplary embodiment of the present disclosure. The order in which the flow diagram for creating the VR project is described should not be construed as a limitation, and any number of the described method blocks can be combined in any order to implement the flow diagram or alternate methods. Additionally, individual blocks may be deleted from the flow diagram without departing from the spirit and scope of the subject matter described herein. Furthermore, the method can be implemented in any suitable hardware, software, firmware, or combination thereof.

At step 602, media files may be received. The media files may be received by a system operated by a user. Specifically, the media files may be received on a software application running on the system. The media files may be provided from a local storage or a remote storage. Further, the media files may be any of 360° and 2D video file, 360° and 2D image file, audio file, and 3D model file.

At step 604, details of interaction between the media files may be received from the user. The details of interaction may include, for example, sequence, position, orientation, distance, and behavior of the media files.

At step 606, a VR project may be created. The VR project may include different versions of the media files. The different versions of the media files may be generated through processing of the media files based on details of the interaction between the media files and predefined configurations of different user devices. Processing of the media files based on the configurations of the user devices may include modifying the resolution of the media files, modifying the orientation of the media files, and compression of the media files.

Figure 7:
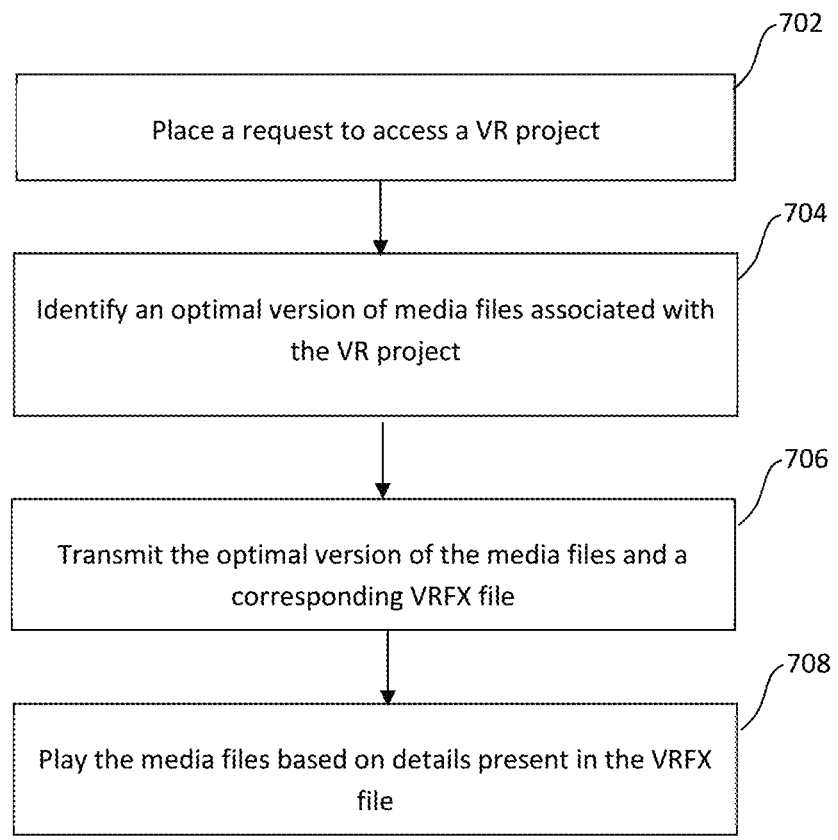
FIG. 7 illustrates a flow chart of a method of identifying and executing an optimal version of media files of the VR projects, in accordance with one embodiment of present disclosure.

Referring to FIG. 7, a flow chart of a method of identifying and executing optimal versions of media files of a VR project is explained, in accordance with one exemplary embodiment of the present disclosure. The order in which the flow diagram for identifying and executing optimal versions of media files of a VR project is described should not be construed as a limitation, and any number of the described method blocks can be combined in any order to implement the flow diagram or alternate methods. Additionally, individual blocks may be deleted from the flow diagram without departing from the spirit and scope of the subject matter described herein. Furthermore, the method can be implemented in any suitable hardware, software, firmware, or combination thereof.

At step 702, a user device may place a request to access a VR project. The request may be shared with a server hosting multiple versions of media files of the VR project. The multiple versions of the media files of the VR projects may be produced by modifying resolution and/or orientation, and compression of media files associated with the VR project, based on predefined configurations of different user devices that may access the VR project.

At step 704, the server may identify an optimal version of the media files associated with the VR project, for the user device. The server may identify the optimal version of the media files based on the configuration of the user device, such as hardware capabilities (processing, display, storage, and communication capability) and firmware type and version of the user device.

At step 706, the server may transmit the optimal version of the media files and a corresponding VRXF file of the VR project to the user device. The VRXF file may include details of interactions between the media files.

At step 708, the user device may play the optimal version of the media files based on the details present in the VRXF file, to deliver a best VR experience of the VR project to the user.

As used in this application, the terms "component," "system," "platform," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like. The user device refers to devices or applications (mobile applications or desktop applications such as browsers or dedicated applications) capable of playing VR files to provide an immersive experience to users.

The server may be implemented in a variety of computing systems, such as a laptop computer, a desktop computer, a notebook, a workstation, a virtual environment, a mainframe computer, a network server, or a cloud-based computing environment.

The communication network providing connection between the user device and the server may be a wireless communication network using a variety of protocols, for example, Hypertext Transfer Protocol (HTTP), Transmission Control Protocol/Internet Protocol (TCP/IP), Wireless Application Protocol (WAP), and the like, to communicate with each other. Further, the communication network may include a variety of network devices including routers, switches, bridges, gateways, and the like.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A system for creation of a VR project, comprising:
a memory configured to store programmed instructions; and
a processor, operatively coupled to the memory, configured to execute the programmed instructions to:
allow a VR project creator to select a plurality of media files;
establish a connection between the plurality of media files by defining one or more interactions between the plurality of media files;
allow the VR project creator to add one or more objects to the plurality of media files;
allow the VR project creator to define an action to the one or more objects;
create a VR project including the plurality of media files, connection between the plurality of media files, the one or more objects, and the action associated with the one or more objects;
store details of the VR project in a text file, wherein the text file is a Virtual Reality Extended Format (VRXF) file and includes references to storage locations of the plurality of media files, storage locations of the one or more objects, the action associated with the one or more objects, and connection between the plurality of media files; and
allow the VR project creator to modify the text file via a text editing component, wherein the modification to the text file modifies the VR project, and wherein the modification is related to at least one of the connection between the plurality of media files and the action associated with the one or more objects.

2. The system of claim 1, wherein the one or more interactions comprise at least one of a sequence, a position, an orientation, and a distance of the plurality of media files.

3. The system of claim 1, wherein the plurality of media files is stored in the memory or is available over Internet.

4. The system of claim 1, wherein the action comprises at least one of show object, hide object, activate object, deactivate object, start animation, pause animation, stop animation, loop video sound, unloop video sound, start video sound, pause video sound, open Uniform Resource Locator (URL), and send webhook.

5. The system of claim 1, wherein the processor executes generative data models for generating the VRXF file and one or more media files.

6. The system of claim 1, wherein access to the text file is provided to a user device in response to a user request and the text file is executed by a VR playing component running on the user device.

7. The system of claim 1, wherein the storage of the text file is performed or the access of the text file is provided based on rules set by a third party.

8. The system of claim 1, wherein the processor processes the plurality of media files to generate multiple versions of the plurality of media files suitable for different configurations of different user devices, wherein the processing includes modifying resolution, modifying orientation, and compression of the plurality of media files.

9. The system of claim 8, wherein the processor provides access of an optimal version of the plurality of media files to the user device, and wherein the processor determines the optimal version of the plurality of media files based on configuration details of the user device, received through the user request.

10. The system of claim 9, wherein the configuration details include software type and version, hardware capability, and Degrees of Freedom (DoF) available for interaction.

11. The system of claim 1, wherein the creation of the VR project is performed by a first processing device and the storage and access of the text file is managed by a second processing device.

12. A method of creation of a VR project, comprising:
allowing a VR project creator to select a plurality of media files;
establishing a connection between the plurality of media files by defining one or more interactions between the plurality of media files;
allowing the VR project creator to add one or more objects to the plurality of media files;
allowing the VR project creator to define an action to the one or more objects;
creating a VR project including the plurality of media files, connection between the plurality of media files, the one or more objects, and the action associated with the one or more objects;
storing details of the VR project in a text file, wherein the text file is a Virtual Reality Extended Format (VRXF) file and includes references to storage locations of the plurality of media files, storage locations of the one or more objects, the action associated with the one or more objects, and connection between the plurality of media files; and
allowing the VR project creator to modify the text file via a text editing component, wherein the modification to the text file modifies the VR project, and wherein the modification is related to at least one of the connection between the plurality of media files and the action associated with the one or more objects.

13. The method of claim 12, wherein the one or more interactions comprise at least one of a sequence, a position, an orientation, and a distance of the plurality of media files.

14. The method of claim 12, wherein the plurality of media files is stored in a local memory of a processing device or is available over Internet.

15. The method of claim 12, wherein the action comprises at least one of show object, hide object, activate object, deactivate object, start animation, pause animation, stop animation, loop video sound, unloop video sound, start video sound, pause video sound, open Uniform Resource Locator (URL), and send webhook.

16. The method of claim 12, further comprising executing generative data models for generating the VRXF file and one or more media files.

17. The method of claim 12, wherein the storage of the text file is performed or the access of the text file is provided based on rules set by a third party.

18. The method of claim 12, further comprising processing the plurality of media files to generate multiple versions of the plurality of media files suitable for different configurations of different user devices, wherein the processing includes modifying resolution, modifying orientation, and compression of the plurality of media files.

19. The method of claim 18, further comprising providing access of an optimal version of the plurality of media files to the user device, and wherein the optimal version of the plurality of media files is determined based on configuration details of the user device received through the user request.

20. The system of claim 1, further comprising modifying the text file via at least one of a VR project creation component and a third party component.

* * * * *